United States Patent
Fassbender et al.

(10) Patent No.: US 6,171,498 B1
(45) Date of Patent: Jan. 9, 2001

(54) UPFLOW WATER CLARIFIER WITH CENTRAL PIER

(75) Inventors: John J. Fassbender, Suamico, WI (US); Daniel H. Phillips, Hinckley, IL (US); David K. Wyness, Islamorada, FL (US)

(73) Assignee: Chicago Bridge & Iron Company, Plainfield, IL (US)

( * ) Notice: Under 35 U.S.C. 154(b), the term of this patent shall be extended for 0 days.

(21) Appl. No.: 09/037,694

(22) Filed: Mar. 10, 1998

(51) Int. Cl.[7] .............................. B01D 21/26; B01D 21/02
(52) U.S. Cl. ...................... 210/512.1; 210/207; 210/220; 210/522; 210/523; 210/532.1; 210/540
(58) Field of Search ...................... 210/207, 220, 210/304, 512.1, 522, 525, 540, 532.1

(56) References Cited

U.S. PATENT DOCUMENTS

| | | | |
|---|---|---|---|
| 4,146,471 | * 3/1979 | Wyness | 210/207 |
| 4,765,891 | * 8/1988 | Wyness | 210/207 |
| 5,804,062 | * 9/1998 | Wyness | 210/207 |

* cited by examiner

Primary Examiner—David A. Reifsnyder
(74) Attorney, Agent, or Firm—Marshall, O'Toole, Gerstein, Murray & Borun

(57) ABSTRACT

An upflow water clarifier for treating a liquid that contains dissolved or suspended solids has a central pier disposed in the center of a conical section angled at an angle of about 40 degrees to about 60 degrees with respect to the horizontal. Water enters the clarifier at the bottom and is removed at the top. The central pier bears at least part of the weight of an observation deck and includes a mechanism for discharging sludge from the clarifier. The pier can also house both a sludge discharge line and an effluent withdrawal line, and as a support for a radial trough used to collect the effluent. The pier may also serve as an aid during construction.

20 Claims, 5 Drawing Sheets

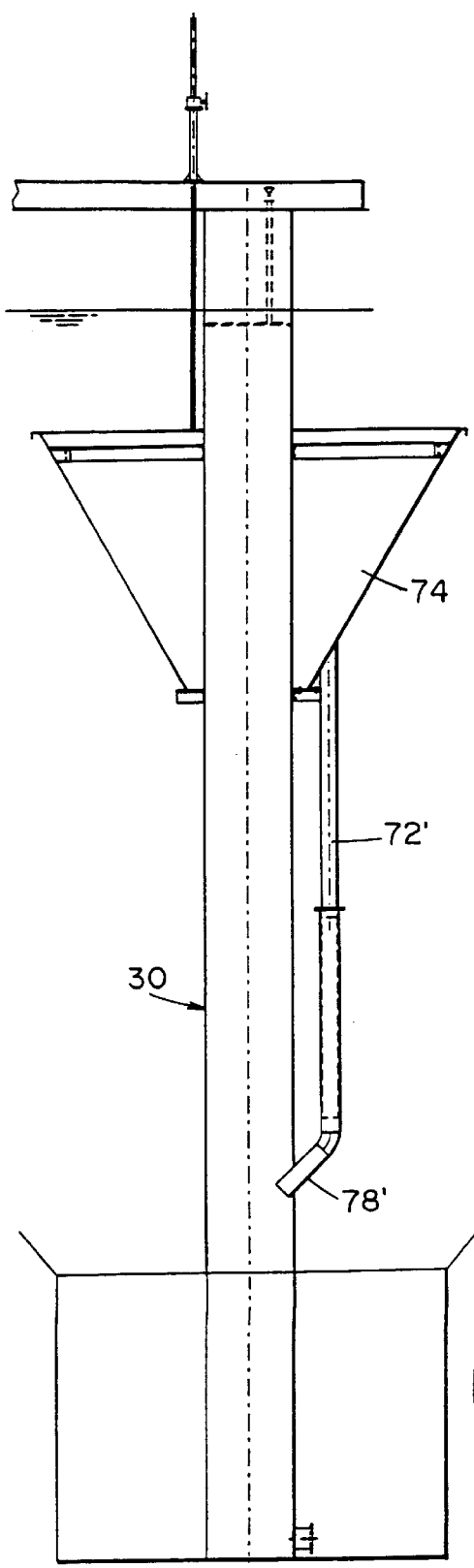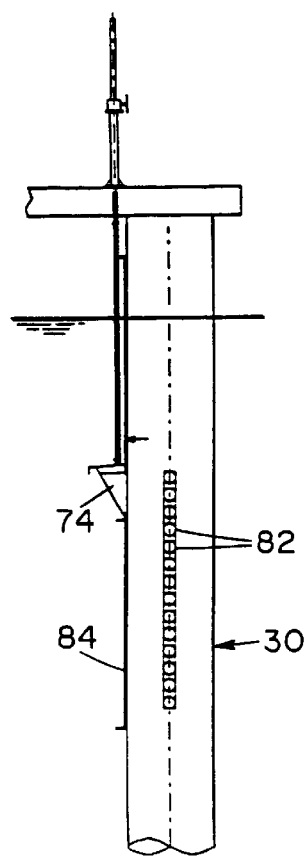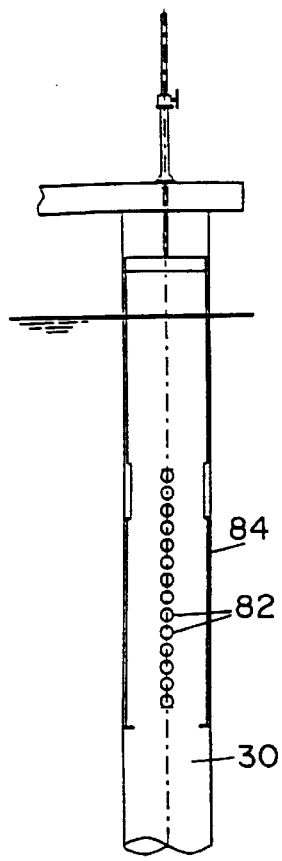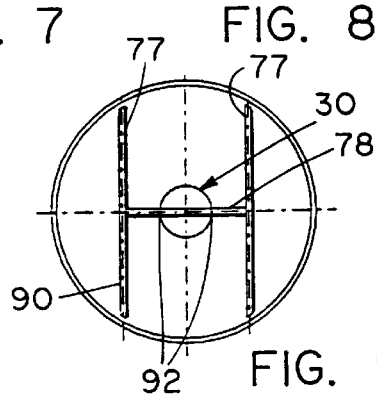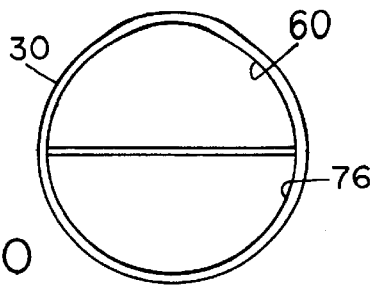
FIG. 5
FIG. 7
FIG. 8
FIG. 9
FIG. 10

UPFLOW WATER CLARIFIER WITH CENTRAL PIER

This invention relates generally to apparatus and methods for treating liquids to remove dissolved or suspended solids, such as for treating water so it may be used for potable or industrial use. In particular, the invention relates to clarifiers in which the liquid flows in an upward helical path, gradually decreasing in velocity until precipitated or suspended solids separate from the rising water to create a rotating sludge blanket beneath a region of clarified water.

BACKGROUND OF THE INVENTION

An upflow water clarifier, such as those disclosed in Wyness U.S. Pat. Nos. 4,146,471 and 4,765,891, is a specific type of clarifier that has a prominent conical portion with the larger diameter at the upper end. Typically, the walls of the clarifier are angled at between about 40 degrees and 60 degrees with respect to the horizontal, although angles outside of this range can also be used. Contaminated water enters the clarifier near the lower end, while clarified effluent is removed from near the upper end. Inside, the water is given a rotational movement, often in part by feeding it into the clarifier in a tangential direction, resulting in a generally upward helical flow of the water within the clarifier.

The increasing diameter of the clarifier toward its upper end causes a decrease in velocity of the flow of liquid as it moves upwardly. As the velocity decreases, suspended solids having a higher density than water agglomerate and separate from the water, forming a revolving sludge blanket that remains behind as clarified water continues upward until being withdrawn as clarified effluent.

Conventionally, the effluent has been removed from the clarifier over weirs, and collected at one or more drop boxes at the periphery of the upper end of the clarifier, while sludge is periodically removed through a sludge concentrator located on the central axis of the clarifier. Traditionally, the sludge concentrator has taken the form of a cone suspended from an overhead observation deck that traverses the top of the clarifier, and has been used to concentrate and reduce the volume of the sludge before it is removed.

SUMMARY OF THE INVENTION

Like other upflow clarifiers, the clarifier has a lower chamber into which contaminated water is fed through a conduit; an upper zone from which clarified water is removed through an outlet; and a conical zone extending upwardly and outwardly from the lower chamber toward the upper zone. Unlike conventional upflow clarifiers with a conical zone, the clarifier includes a central pier extending through the lower chamber, the conical zone, and the upper zone.

The pier bears at least part of the weight of an observation and access deck that spans at least a portion of the clarifier. The use of a central pier allows significant cost savings to be realized by using only a half-span deck, instead of the full-span decks conventionally used with upflow clarifiers, or by reducing the size of the beams in a full-span deck.

Like conventional clarifiers, the present clarifier includes a mechanism for discharging sludge from the clarifier. Unlike conventional clarifiers, the new clarifier includes this mechanism on the central pier. This use of a central pier further reduces the load requirements on the observation deck (which, in many conventional upflow clarifiers, must support the weight of a sludge concentrator). In addition, the interior of the pier can be used to temporarily hold and thicken the sludge before it is discharged, permitting the sludge concentrator cone to be reduced in size or even eliminated altogether. The interior of the pier can also be used as a sludge discharge line.

A central pier can also be designed to accommodate a central effluent withdrawal line. Such a design allows radial troughs to be used to collect and channel effluent to a central collection point, eliminating the need for a series of external collection drop boxes on the outer periphery of the clarifier. Further, routing an effluent withdrawal line through a central pier can provide thermal insolation, resulting in a reduced risk of freezing in the line.

The presence of a central pier in the lower chamber may also improve mixing in that part of the clarifier, which is believed to have a beneficial impact on water clarification.

A central pier can also be used as an aid during construction, allowing the clarifier to be built less expensively and more precisely.

Further advantages should be apparent to those skilled in the art upon reviewing the following detailed description and accompanying drawings, in which:

BRIEF DESCRIPTION OF THE DRAWINGS

FIG. 5 is a cross-sectional elevational view of an alternative embodiment of a sludge removal mechanism that could be used in the clarifier of FIGS. 1–3;

FIG. 7 is a cross-sectional elevational view of yet another alternative embodiment of a sludge removal mechanism;

FIG. 8 is a cross-sectional elevational view of still another alternative embodiment of a sludge removal mechanism;

FIG. 9 is a plan view of bracing across the top of a sludge removal mechanism like those shown in FIGS. 5 and 6; and FIG. 10 is an enlarged plan view of a central pier incorporating both a sludge discharge line and an effluent withdrawal line.

DETAILED DESCRIPTION OF THE DRAWINGS

Figure 1:
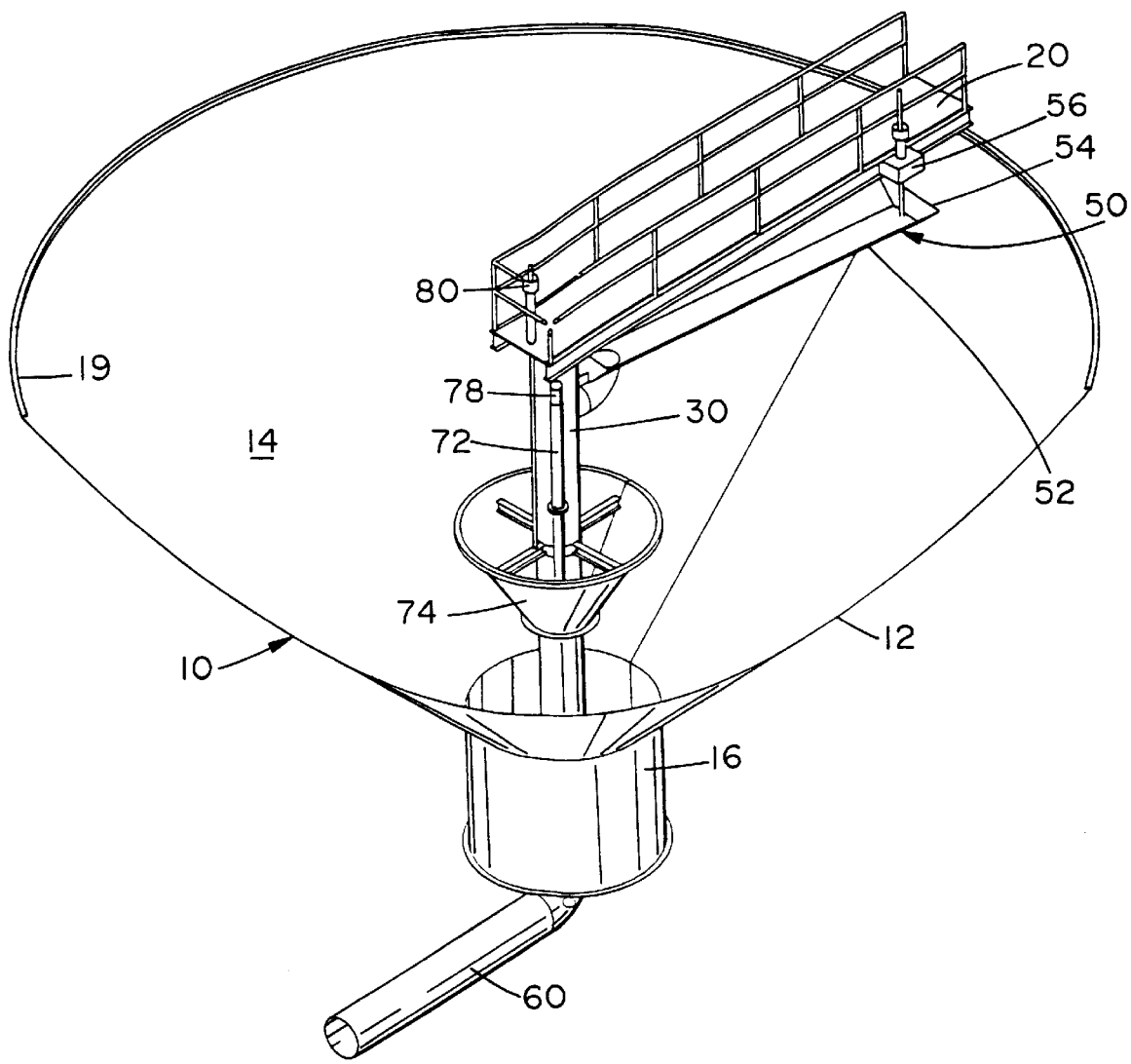
FIG. 1 is a perspective view of one version of a water clarifier in accordance with the present invention.

FIG. 1 shows one embodiment of an upflow clarifier 10 in which water is clarified. The illustrated clarifier may be used not only for clarifying water for industrial use, but also for clarifying drinking water. The clarifier has a wall 12 in the form of a frustrum of a cone defining a conical section 14. The wall extends upwardly and outwardly from a lower chamber 16, which forms the base of the clarifier. The lower chamber is preferably cylindrical, but other geometries, including a truncated conical section is continuous with the conical section 14 or a conical section that continues all the way to an apex, may also be useful. As illustrated, an upper section 18 (best seen in FIG. 3) includes a short cylindrical section 19. The upper section may also be designed to be fully continuous with the conical section, in, for example, what could be referred to as an "all-cone" design.

An access and observation deck 20 spans a portion of the upper section 18 of the clarifier 10 to enable the operator to make a visual inspection of the water being clarified and to operate equipment such as a screw jack 80. At least a part of the weight of the deck is supported by a central pier 30 extending through the lower chamber 16, the conical section 14, and the upper section 18 of the clarifier. As illustrated, the deck spans only half the diameter of the upper section, and is thus significantly less expensive to build than the full-diameter decks commonly used in upflow clarifiers.

Conduits 40 (seen in FIG. 3) allow untreated water to be fed to the clarifier 10 through one or more tangential inlets 42 (seen in FIG. 3) on the lower chamber 16. When in use, clarified effluent is withdrawn from the clarifier through an outlet 50 in the upper section 18. As is conventionally known, a tangential positioning of the inlets in the lower chamber, along with the removal of liquid from the upper section serves to develop an upward helical flow in the liquid in the conical section 14. Vanes (not shown) could also be used to develop a helical flow, and it is not necessary to provide multiple inlets as shown here.

One or more chemical inlets for introducing water treatment chemicals, such as precipitating, coagulating, and/or flocculating agents, can also be provided in either the lower section 16 or the conical section 14.

As the water rises in a helical path through the conical section 14 of the clarifier 10, it spreads to fill the increasing cross-sectional area of the clarifier. This results in a corresponding decrease in the velocity of the water traveling through the clarifier, while the net flow rate remains constant. The velocity continues to decrease as the flow moves upwardly until a point is reached where the lifting force of the water and the counteracting gravitational force on the suspended solids are in equilibrium. At that point, the lifting force of the water is not great enough to lift the suspended solids any higher in the clarifier, and they tend to accumulate in what becomes a suspended sludge blanket rotating in the upper regions of the conical section.

In order to assure that the vessel in economical, it is generally preferable that the wall 12 of the conical section 14 be angled no more than about 60 degrees with respect to the horizontal. In order to assure that the sludge blanket particles do not settle and accumulate on the wall 12 of the conical section 14, it is generally preferable that it be angled at least about 40 degrees with respect to the horizontal.

As the solids accumulate in a sludge blanket, water continues to flow upwardly through the blanket, resulting in a layer of clarified water in the upper section 18 of the clarifier 10 above the blanket.

As illustrated in FIG. 1, the outlet 50 for withdrawing effluent from the upper section 18 of the clarifier 10 can take the form of one or more radial weir troughs 52 that are at least partially supported by the central pier 30. Partially supporting such troughs from a central pier reduces the load requirements of the observation deck 20 from which such troughs are otherwise commonly suspended, again permitting a savings in the size and cost of the deck beams.

Figure 2:
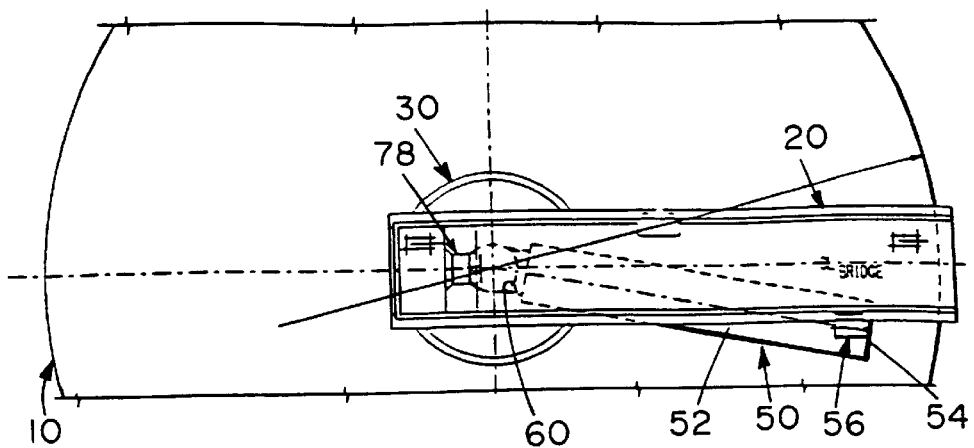
FIG. 2 is a partial plan view of the clarifier of FIG. 1.
Figure 3:
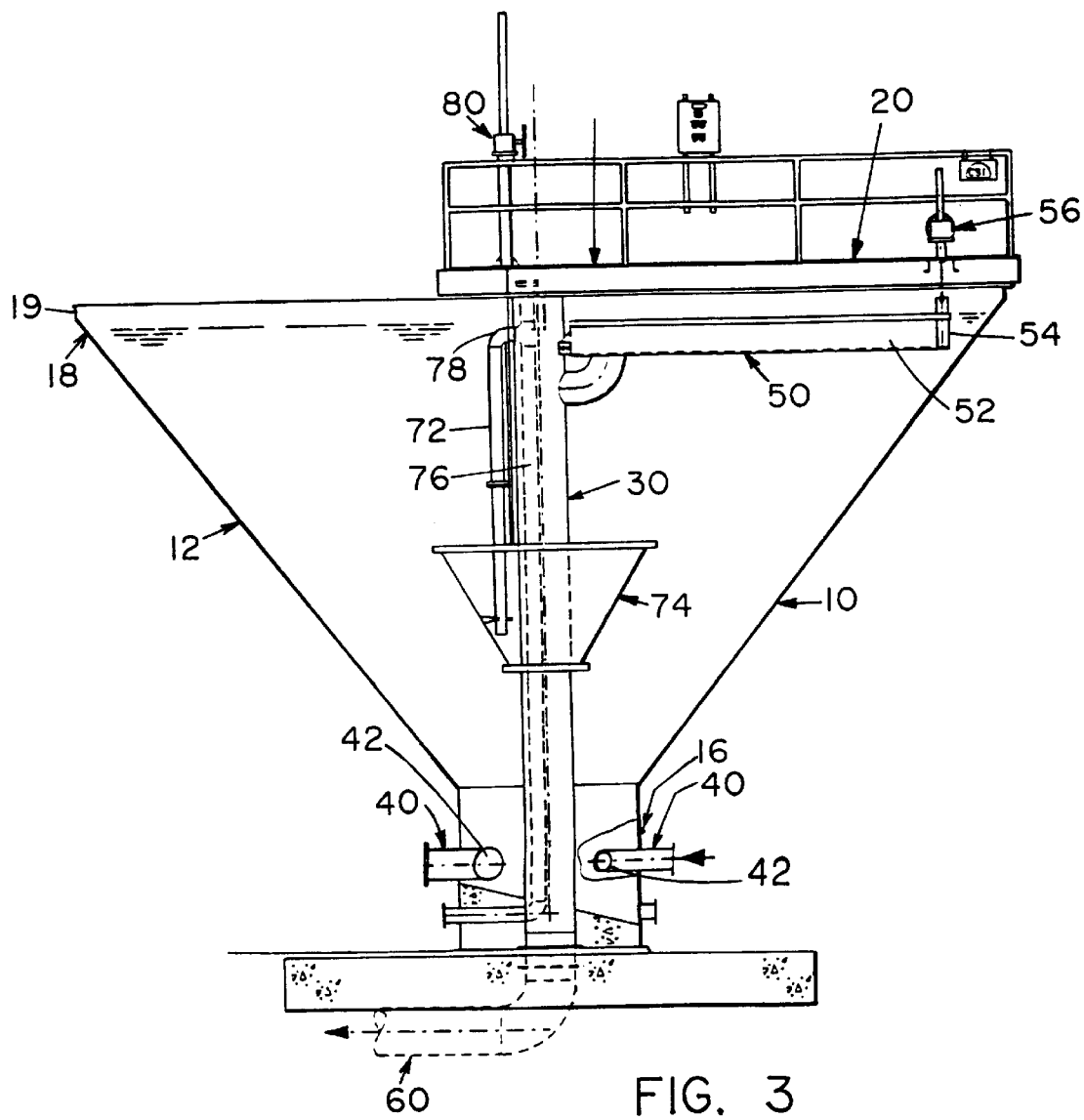
FIG. 3 is a cross-sectional elevational view of the clarifier of FIG. 1.

As illustrated in FIGS. 1–3, the weir trough 52 is pivotably fixed to the central pier 30 so that its outer end 54 is vertically adjustable. The outer end can be raised or lowered by an adjustment mechanism 56, which enables the operator to change the proportion of the water being withdrawn from the central parts of the upper section 18 of the clarifier 10 as opposed to the peripheral parts of the upper section. For example, when the water quality at the central parts of the upper section is particularly good, the outer end of the trough can be raised, resulting in a greater proportion of water being removed from the central parts. Conversely, when it is desirable to increase the proportion of water taken from the periphery of the clarifier, the adjustment mechanism can be used to lower the outer end of the trough.

Figure 4:
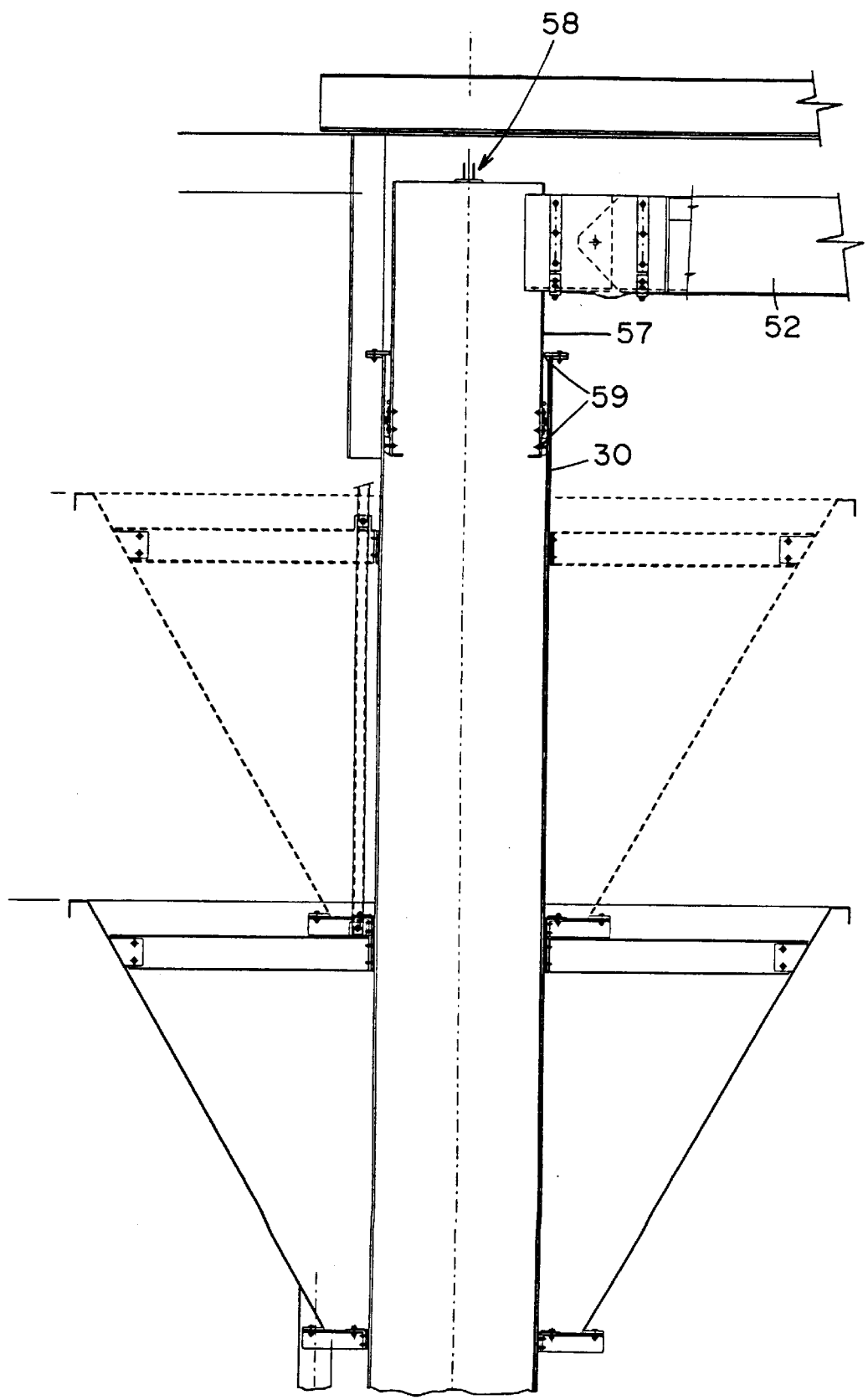
FIG. 4 is a partial cross-sectional elevational view of an alternative embodiment of a weir trough connection that could be used in the clarifier of FIGS. 1–3.

Alternatively, the weir trough could be pivotally fixed at the clarifier wall and constructed so that its inner end can be vertically adjusted. As illustrated in FIG. 4, the inner end of the weir trough 52 is connected to a sleeve 57 on the central pier 30, which includes a lift point 58 which can be connected to a suitable height adjustment mechanism, such as a screw jack. Gaskets 59 are provided to prevent leakage between the sleeve and the central pier 30.

The outlet 50 can of course be arranged in other ways. For example, conventional radial wiers or peripheral wiers can also be used.

As illustrated in FIGS. 1–3, the radial weir trough 52 is connected to an effluent withdrawal line 60 that extends through the central pier 30. In this arrangement, effluent is routed through a central location in the central pier, rather than through external drop boxes or the like commonly used on conventional upflow clarifiers and connected by peripheral pipes. Because it collects effluent at a central location, the arrangement illustrated here requires less piping than conventional arrangements, and thus can offer a savings in installation, painting, and maintenance costs. Routing the effluent through a central location also provides superior thermal insolation for the withdrawn effluent, reducing the risk of freezing in cold-weather areas.

Of course, the effluent withdrawal line 60 need not extend through the central pier 30 to achieve these benefits. It can, for example, simply run along-side the central pier. Further, the invention provides benefits even if the effluent is not withdrawn from a central location.

In upflow clarifiers, it is periodically necessary to remove sludge from the sludge blanket. In some conventional upflow clarifiers, sludge is removed through a conical sludge concentrator cone suspended from the observation deck, adding to the load requirements of the observation deck. In the present invention, sludge is withdrawn through a sludge removal structure on the central pier 30. The sludge removal structure can take many different forms.

It is preferable, though not necessary, that the sludge removal structure be vertically adjustable. As illustrated in FIGS. 1–3, vertical adjustability of the sludge removal structure can be achieved through the use of a telescoping conduit 72 that connects a portion of a concentrator cone 74 to a sludge discharge line 76 (FIG. 3). In this form of a sludge removal structure, the telescoping conduit extends upwardly from a portion of the concentrator cone to a connection 78 with the discharge line. The concentrator cone can be moved vertically by the screw jack 80. As the cone is moved upwardly, the telescoping conduit collapses. As the cone is moved downwardly, the telescoping conduit extends.

An alternative form of a sludge removal structure is illustrated in FIG. 5. In this form, the telescoping conduit 72' extends downwardly from a portion of the sludge concentrator cone 74 to a connection 78' with the sludge discharge line within the central pier 30. Here, the telescoping conduit extends as the concentrator cone is moved upwardly, and collapses as the cone is moved downwardly.

Figure 6:
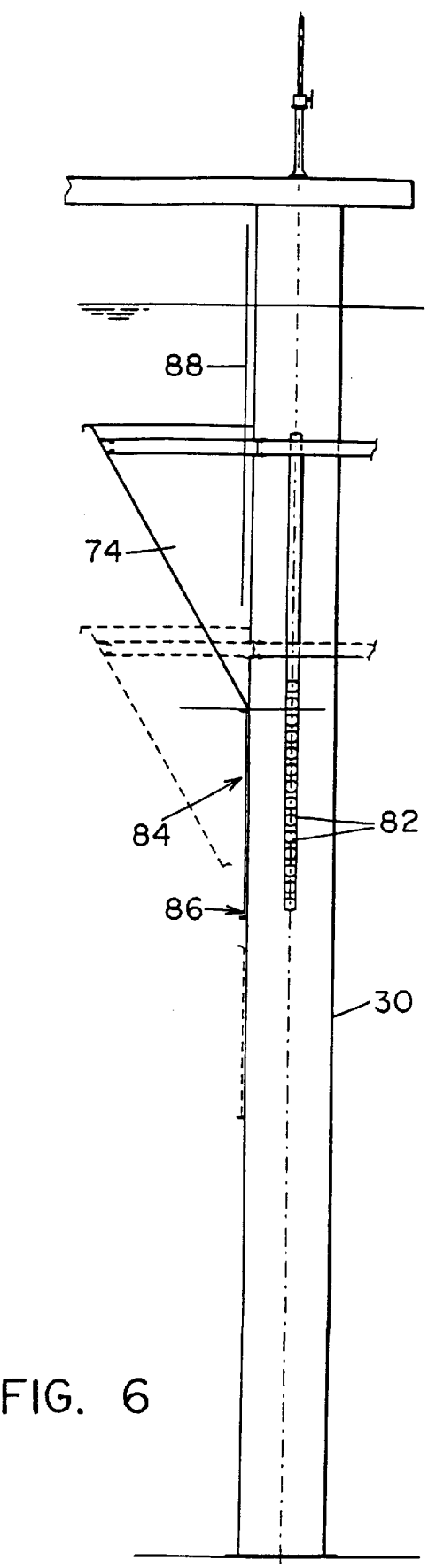
FIG. 6 is a cross-sectional elevational view of another alternative embodiment of a sludge removal mechanism.

FIGS. 6–8 illustrate other alternative forms of suitable sludge removal structures. In FIG. 6, the central pier 30 includes a vertically-arranged set of apertures 82 connecting the exterior of the central pier to a sludge discharge line within the central pier. The sludge concentrator cone 74 is fixed to a sleeve 84 that can slide vertically along the central pier. As the sleeve is raised or lowered, it covers the apertures that are located below the sludge concentrator. The sleeve includes a lower gasket 86 that seals the gap between the sleeve 84 and the pier 30. As illustrated, the sleeve also includes an external upper sleeve 88 that slides over the outside of the central pier above a lower portion of the cone to cover the apertures above those through which sludge will be removed.

Conventional upflow clarifiers utilize relatively large conical sludge concentrators to provide a large volume in which sludge is concentrated or thickened before being discharged. The use of a relatively large-diameter sludge discharge line 76 in a central pier 30 can serve the same purpose, allowing the concentrator cone to be reduced in size or even eliminated altogether. Providing a greater sludge-reducing volume can enable the use smaller and less expensive thickeners, lagoons, and/or dewatering equipment to handle the waste sludge removed from the clarifier 10.

FIGS. 7 and 8 illustrate how the use of the internal space within a central pier 30 for sludge storage and concentration can be used to minimize the size of a sludge concentrator. In the structure illustrated in FIG. 7, for example, the sludge removal mechanism is functionally identical to the structure shown in FIG. 6, but with a much smaller concentrator cone 74. In the structure illustrated in FIG. 8, the cone has been eliminated altogether, leaving only an internal sleeve 84.

In all of these structures illustrated in FIGS. 6–8, the set of apertures 82 leading to the sludge discharge line 76 could be replaced by a vertically-arranged slot. When using a slot, it may be desirable to add internal stiffening 90 to the central pier 30.

FIG. 9 illustrates an arrangement of structural support members 77, 78 across the top of the sludge concentrator cone 74, one of which passes through a set of opposed slots 92 in the central pier 30. This member 78 allows the concentrator to be lifted from a central point within the central pier, as shown in FIG. 5.

While the embodiments illustrated in FIGS. 6–8 do not specifically illustrate an effluent discharge line in the central pier 30, such a line can be readily incorporated. FIG. 10, for example, illustrates one of many ways in which the interior volume of the central pier can be divided into both an effluent withdrawal line 60 and a sludge discharge line 76.

The benefits of the use of a central pier are also believed to extend to the liquid treatment process itself. It is believed that, for example, the use of a 2'-0" diameter central pier extending through a 8'-6" diameter lower chamber 16 provides improved mixing in that chamber, resulting in overall improved results in the clarifier.

A central pier can also be used as a construction aid when the clarifier is being built. The conical section of an upflow clarifier is commonly built by welding together shell plates. It is common to erect temporary members to support the shell plates from the ground while the plates are being welded, and to remove the temporary members after the welding is completed. Using a central pier as a construction aid can reduce the need for temporary members, saving expense, and provide a basis for more accurate alignment of the plates while they are being welded.

This detailed description has been given only for clearness of understanding. As many modifications will be obvious to those skilled in the art, no unnecessary limitations should be understood from this description. Instead, reference should be made to the following claims.

What is claimed is:

1. A clarifier for treating a liquid containing dissolved or suspended solids, the clarifier comprising:

a lower chamber
an upper section;
a conical section extending upwardly and outwardly from the lower chamber toward the upper section;
a conduit for feeding liquid directly into the lower chamber;
means for developing an upward helical flow in liquid in the conical section;
an outlet for liquid in the upper section;
a deck spanning at least a portion of the upper section; and
a load-bearing central pier having a diameter of at least about 4" at the point where the liquid is fed into the lower chamber, the load-bearing central pier extending through the lower chamber, the conical section and the upper section and, the load-bearing central pier bearing at least a part of the weight of the deck.

2. A clarifier as recited in claim 1, in which the of the diameter of the load-bearing central pier is at least about 15% of the diameter of the lower chamber at the point where the liquid is feed into the lower chamber.

3. A clarifier as recited in claim 1, in which effluent is routed through the central pier.

4. A clarifier as recited in claim 1, in which the outlet comprises a radial trough with an inner end that is vertically adjustable.

5. A clarifier as recited in claim 1 comprising means for clarifying water sufficiently for human consumption.

6. A clarifier as recited in claim 1, in which the deck is no loner than half the diameter of the upper section of the clarifier.

7. A clarifier as recited in claim 1, in which:
the central pier includes a slot; and
the means for removing sludge includes a member that passes through the slot.

8. A clarifier as recited in claim 1, in which the central pier comprises a sludge removal means.

9. A clarifier as recited in claim 8, in which the sludge removal means is vertically adjustable.

10. A clarifier as recited in claim 8, in which:
the central pier has a set of apertures leading to a discharge line; and
the sludge removal means includes a sleeve that can slide vertically along the central pier, covering different apertures at different vertical positions.

11. A clarifier as recited in claim 8, in which:
the central pier has a vertical slot leading to a sludge discharge line; and
the sludge removal means includes a sleeve that can slide vertically along the central pier, covering different portions of the slot.

12. A clarifier as recited in claim 8, in which the sludge removal means includes a telescoping conduit that extends upwardly from a sludge concentrator cone to a connection with a sludge discharge line.

13. A clarifier as recited in claim 8, in which the sludge removal means includes a telescoping conduit that extends downwardly from a sludge concentrator to a connection with a sludge discharge line.

14. A clarifier as recited in claim 13, further comprising means on the central pier for removing sludge from the clarifier.

15. A clarifier as recited in claim 8, in which the central pier comprises means for fully supporting the weight of the sludge removal means while the clarifier is in operation.

16. A clarifier for treating a liquid containing dissolved or suspended solids, the clarifier comprising:

a lower chamber;

an upper section;

a conical section extending upwardly and outwardly from the lower chamber toward the upper section;

a conduit for feeding liquid directly to the lower chamber;

means for developing an upward helical flow in liquid in the conical section;

a deck spanning at least a portion of the upper section;

a central pier extending through the lower chamber, the conical section, and the upper section; and an outlet for liquid in the upper section comprising a radial trough that is at least partially supported by the central pier.

17. A clarifier for treating a liquid containing dissolved or suspended solids, the clarifier comprising:

a lower chamber;

an upper section;

a conical section extending upwardly and outwardly from the lower chamber toward the upper section;

a conduit for feeding liquid directly to the lower chamber;

means for developing an upward helical flow in liquid in the conical section;

an outlet for liquid in the upper section comprising a radial trough;

a deck spanning at least a portion of the upper section; and a central pier extending through the lower chamber, the conical section, and the upper section, and at least partially comprising an effluent withdrawal line connected to the outlet.

18. A clarifier for treating a liquid containing dissolved or suspended solids, the clarifier comprising:

a lower chamber;

an upper section;

a conical section extending upwardly and outwardly from the lower chamber toward the upper section;

a conduit for feeding liquid directly to the lower chamber;

means for developing an upward helical flow in liquid in the conical section;

a deck spanning at least a portion of the upper section;

a central pier extending through the lower chamber, the conical section, and the upper section; and an outlet for liquid in the upper section comprising a radial trough with an inner end that is connected to and supported by the central pier and an outer end that is vertically adjustable.

19. A clarifier for treating a liquid containing dissolved or suspended solids, the clarifier comprising:

a lower chamber;

an upper section;

a conical section extending upwardly and outwardly from the lower chamber toward the upper section;

a conduit for feeding liquid directly to the lower chamber;

means for developing an upward helical flow in liquid in the conical section;

an outlet for liquid in the upper section;

a deck spanning at least a portion of the upper section;

a central pier extending through the lower chamber, the conical section, and the upper section; and a thermally-protected discharge line extending from the outlet through the central pier.

20. A clarifier for treating a liquid containing dissolved or suspended solids, the clarifier comprising:

a lower chamber an upper section;

a conical section extending upwardly and outwardly from the lower chamber toward the upper section at an angle of between about 40 degrees and about 60 degrees to the horizontal;

a conduit for feeding liquid directly into the lower chamber;

means for developing an upward helical flow in liquid in the conical section;

an outlet for liquid in the upper section;

a deck spanning at least a portion of the upper section;

a load-bearing central pier having a diameter of at least about 4" at the point where the liquid is fed into the lower chamber, the load-bearing central pier extending through the lower chamber, the conical section and the upper section and, the load-bearing central pier bearing at least a part of the weight of the deck; and means on the central pier for removing sludge from the clarifier.

\* \* \* \* \*